United States Patent [19]
Kamei

[11] Patent Number: 6,018,586
[45] Date of Patent: Jan. 25, 2000

[54] APPARATUS FOR EXTRACTING SKIN PATTERN FEATURES AND A SKIN PATTERN IMAGE PROCESSOR USING SUBREGION FILTERING

[75] Inventor: Toshio Kamei, Tokyo, Japan

[73] Assignee: NEC Corporation, Tokyo, Japan

[21] Appl. No.: 08/631,223

[22] Filed: Apr. 12, 1996

[30] Foreign Application Priority Data

Apr. 12, 1995 [JP] Japan ................................. 7-086754

[51] Int. Cl.⁷ ........................................... G06K 9/46
[52] U.S. Cl. .......................................... 382/125; 382/195
[58] Field of Search .................................. 382/124, 125, 382/115, 280, 281, 260, 199, 202, 210, 261, 195; 283/68

[56] References Cited

U.S. PATENT DOCUMENTS

| | | | |
|---|---|---|---|
| 5,072,314 | 12/1991 | Chang | 382/280 |
| 5,105,467 | 4/1992 | Kim et al. | 382/125 |
| 5,189,513 | 2/1993 | Sekine et al. | 382/280 |
| 5,588,073 | 12/1996 | Lee et al. | 382/187 |
| 5,659,626 | 8/1997 | Ort et al. | 382/125 |

FOREIGN PATENT DOCUMENTS

| | | |
|---|---|---|
| 0 551 086 | 7/1993 | European Pat. Off. . |
| 51-077138 | 7/1976 | Japan . |
| 5-181956 | 7/1993 | Japan . |

OTHER PUBLICATIONS

B.G. Sherlock, "Fingerprint Enhancement by Directional Fourier Filtering", Image Signal Process., vol. 141, No. 2, Apr. 1994, pp. 87–94.

T. Kamei et al., "Image Filter Design for Fingerprint Enhancement", IEEE Int. Symp on Computer Vision, Nov. 1995, pp. 109–114.

Ratha et al., "Adaptive Flow Orientation–Based Feature Extraction in Fingerprint Images," Pattern Recognition, vol. 28, No. 11, pp. 1657–1672, Mar. 1995.

Gonzales et al, "Digital Image Processing", 1992, Addison–Wesley Pub. Co, pp. 187–189.

Primary Examiner—Amelia Au
Assistant Examiner—Larry J. Prikockis
Attorney, Agent, or Firm—Foley & Lardner

[57] ABSTRACT

A skin pattern image is filtered by convolution calculation on a real plane or product calculation on a Fourier transformed plane with each of two-dimensional filters prepared according to kinds of features to be extracted of the skin pattern image. Image intensity of each subregion of each filtered data is calculated. Feature of each subregion is represented by a feature parameter corresponding to a filter that gives a highest value of the image intensity of the subregion. An initial pattern of features thus obtained is smoothed to minimize an evaluation function. A filtered skin pattern image having pixel values of each subregion smoothed by a set of filters prepared for extracting a kind of features is further filtered by another set of filters for extracting another kind of features.

4 Claims, 11 Drawing Sheets

FIG. 3

|     | R₁ (cycle) | R₂ (cycle) |
|-----|------------|------------|
| h₁  | 25         | 40         |
| h₂  | 40         | 55         |
| h₃  | 55         | 70         |
| h₄  | 70         | 85         |
| h₅  | 85         | 100        |

FIG. 4(a)
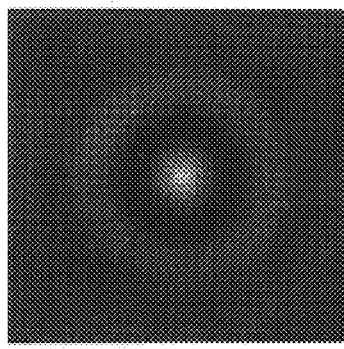
$(R_1, R_2) = (25, 40)$
FIG. 4(b)
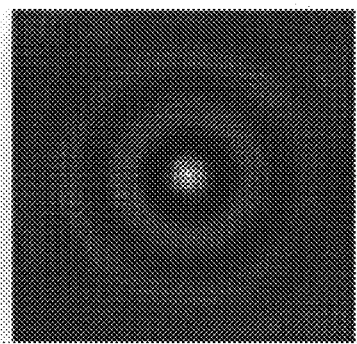
$(R_1, R_2) = (40, 55)$
FIG. 4(c)
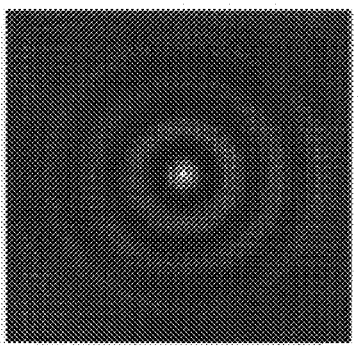
$(R_1, R_2) = (55, 70)$
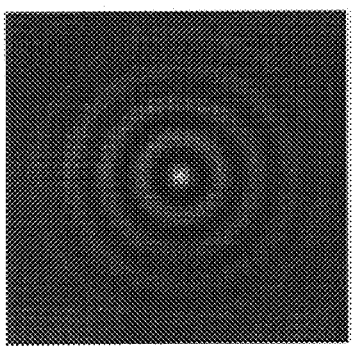
$(R_1, R_2) = (70, 85)$
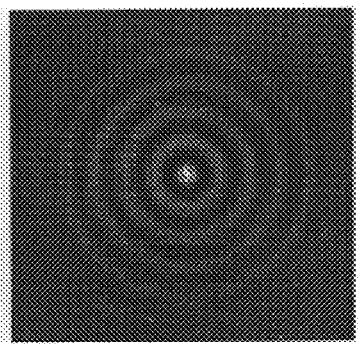
$(R_1, R_2) = (85, 100)$
FIG. 4(d)    FIG. 4(e)

| (m-2,n-2) | (m-1,n-2) | (m,n-2) | (m+1,n-2) | (m+2,n-2) |
|---|---|---|---|---|
| (m-2,n-1) | (m-1,n-1) | (m,n-1) | (m+1,n-1) | (m+2,n-1) |
| (m-2,n) | (m-1,n) | (m,n) | (m+1,n) | (m+2,n) |
| (m-2,n+1) | (m-1,n+1) | (m,n+1) | (m+1,n+1) | (m+2,n+1) |
| (m-2,n+2) | (m-1,n+2) | (m,n+2) | (m+1,n+2) | (m+2,n+2) |

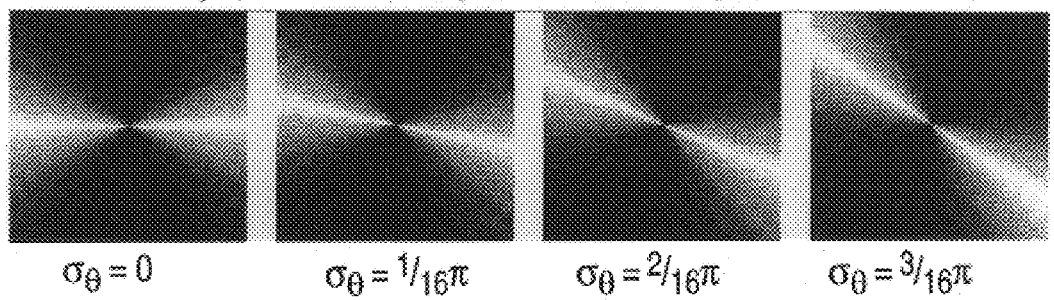

$\sigma_\theta = 0$     $\sigma_\theta = {}^1/_{16}\pi$     $\sigma_\theta = {}^2/_{16}\pi$     $\sigma_\theta = {}^3/_{16}\pi$ FIG. 13(e)  FIG. 13(f)  FIG. 13(g)  FIG. 13(h)

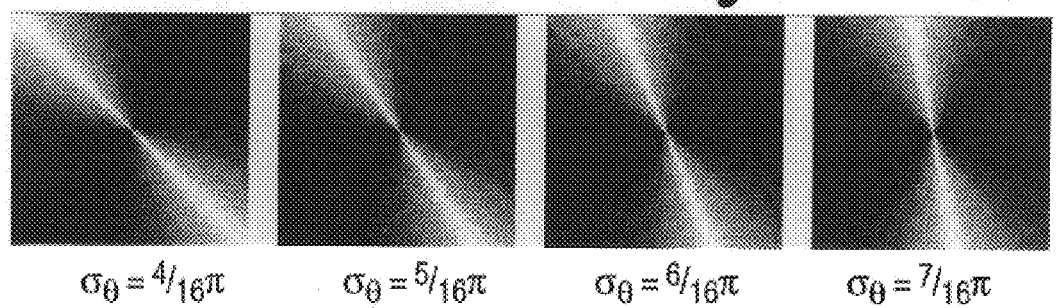

$\sigma_\theta = {}^4/_{16}\pi$     $\sigma_\theta = {}^5/_{16}\pi$     $\sigma_\theta = {}^6/_{16}\pi$     $\sigma_\theta = {}^7/_{16}\pi$ FIG. 13(i)  FIG. 13(j)  FIG. 13(k)  FIG. 13(l)

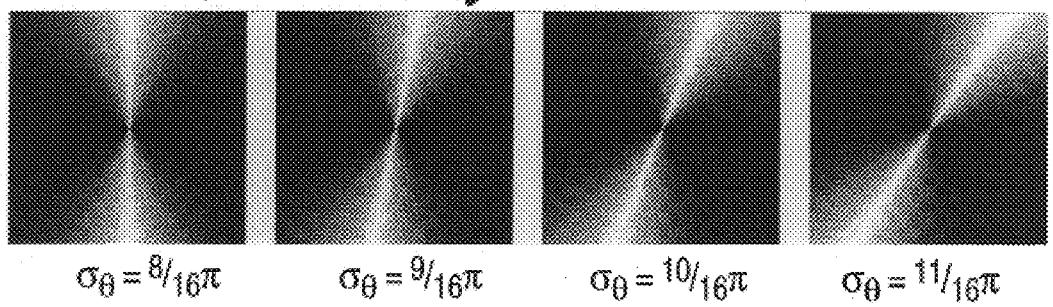

$\sigma_\theta = {}^8/_{16}\pi$     $\sigma_\theta = {}^9/_{16}\pi$     $\sigma_\theta = {}^{10}/_{16}\pi$     $\sigma_\theta = {}^{11}/_{16}\pi$ FIG. 13(m)  FIG. 13(n)  FIG. 13(o)  FIG. 13(p)

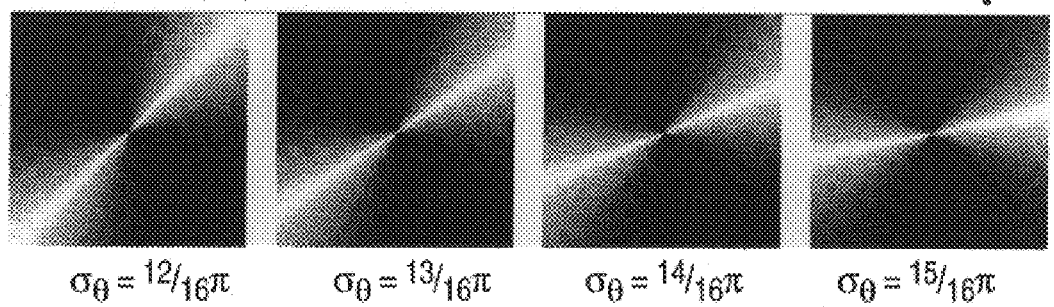

$\sigma_\theta = {}^{12}/_{16}\pi$     $\sigma_\theta = {}^{13}/_{16}\pi$     $\sigma_\theta = {}^{14}/_{16}\pi$     $\sigma_\theta = {}^{15}/_{16}\pi$

100

APPARATUS FOR EXTRACTING SKIN PATTERN FEATURES AND A SKIN PATTERN IMAGE PROCESSOR USING SUBREGION FILTERING

BACKGROUND OF THE INVENTION

This invention relates to an apparatus for extracting features of skin pattern images and an image processor for smoothing and enhancing features of the skin pattern images making use of the extracted features. More particularly, the invention relates to an apparatus for extracting such features as ridge line directions, ridge line pitches or their combination of skin pattern images for fingerprint verification, fingerprint classification or palm print verification, and an image processor for processing skin pattern images for enhancing ridge lines by eliminating noises of the images maling use of the extracted features.

As a prior art, there is a Japanese patent application entitled "An Apparatus for Striped Pattern Extraction" and laid open as a Provisional Publication No. 77138/76. In the prior art, which is hereafter called a first prior art, an apparatus is disclosed for eliminating noises from such striped images as fingerprints or tree rings and extracting both stripe patterns and directional patterns of the striped images.

FIG. 14 shows the principle of the apparatus of the first prior art. An image in a subregion 100 with its center at a small square 101 is represented by a set of pixel data. Each small square in the subregion 100 represents a pixel, and a numeral 1 or a blank in a small square means corresponding pixel value 1 (black) or 0 (white). Filter data sets 102, 103, 104, 105, and 106 for masking are prepared corresponding to no direction d0 and four directions d1, d2, d3, and d4, respectively. By calculating their sum of products with the pixel data of the image exampled in FIG. 14, values +5, 0, +11, +3 and −7 are obtained corresponding to each direction d0 to d4, respectively.

From these values, ridge direction at pixel 101 of the image is determined to the direction d2 which gives the maximum value +11 and stripe pattern value at the pixel 101 is determined to the maximum value +11.

Thus, stripe patterns and directional patterns are extracted as features of striped images in the first prior art.

Smoothing of extracted features is sometimes necessary for decreasing noise influence on the features. For instance, a smoothing method is disclosed in a Japanese patent application entitled "Method of Smoothing a Ridge Direction Pattern and an Equipment used therefor" and laid open as a Provisional Publication No. 18195/93. This smoothing method, hereafter called a second prior art, is based on a minimum energy principle.

From ridge direction data extracted with their reliability coefficients, a smoothed ridge direction pattern is determined in the prior art, wherein it is assumed that direction data extracted with higher reliability needs more energy to be smoothed into a direction pattern and that it needs more energy to smooth direction data into a direction pattern the more different from neighboring direction patterns. Therefore, a direction pattern which gives a minimum value of an evaluation function, linear summation of those energies, is determined as the smoothed direction pattern of a subregion.

However, pixel values of a striped image vary periodically in a direction perpendicular to the stripes. Therefore, when stripe phase of a striped image is nearly orthogonal to the stripe phase of the filter data for masking used in the first prior art, the sum of products results nearly 0 even when both directions coincide with each other. This means that the extracted direction patterns and, consequently, the extracted stripe patterns become unreliable since they are influenced by noise data, making precise ridge line pitch extracion difficult.

In the second prior art, smoothing of ridge direction patterns is performed based on extracted ridge directions. So, when extracted ridge direction data are not reliable, precise smoothing of ridge direction patterns and, consequently, precise smoothing of ridge line pitches can not be performed.

SUMMARY OF THE INVENTION

Therefore, a primary object of the invention is to provide an apparatus for extracting features such as ridge directions, ridge line pitches or their combination from skin pattern images with high reliability regardless of the stripe phase difference, and another object is to provide a skin pattern image processor for precisely enhancing ridge line patterns by eliminating noises from the skin pattern images.

In order to achieve the objects, a plurality of filters consisting of two-dimensional weight coefficient matrix are prepared in the present invention according to kinds of features to be extracted.

A skin pattern image is filtered with each by each of the plurality of filters by convolution calculation on a real plane or by product calculation of each frequency component on a Fourier transformed plane.

Contrast or image intensity, that is, a square sum of pixel values of a subregion of each filtered image thus calculated is compared with each other and a feature parameter represented by a filter which gives a largest image intensity is determined as the feature to be extracted of the subregion of the skin pattern image.

And from pixel values of the image data of subregions filtered by a filter giving the feature of the subregion, image data of the subregion with enhanced feature can be obtained at the same time.

BRIEF DESCRIPTION OF THE DRAWINGS

The foregoing, further objects, features, and advantages of this invention will become apparent from a consideration of the following description, the appended claims, and the accompanying drawings in which the same numerals indicate the same or the corresponding parts.

FIG. 3 shows frequency bands of five filters prepared for extracting ridge line pitches.

FIG. 4 shows shading images of the five filters of FIG. 3.

FIG. 13 shows shading images of examples of filters prepared in a second filter file 812 of FIG. 11.

DETAILED DESCRIPTION OF THE PREFERRED EMBODIMENTS

Now, embodiments of the present invention will be described in connection with the drawings.

Figure 1:
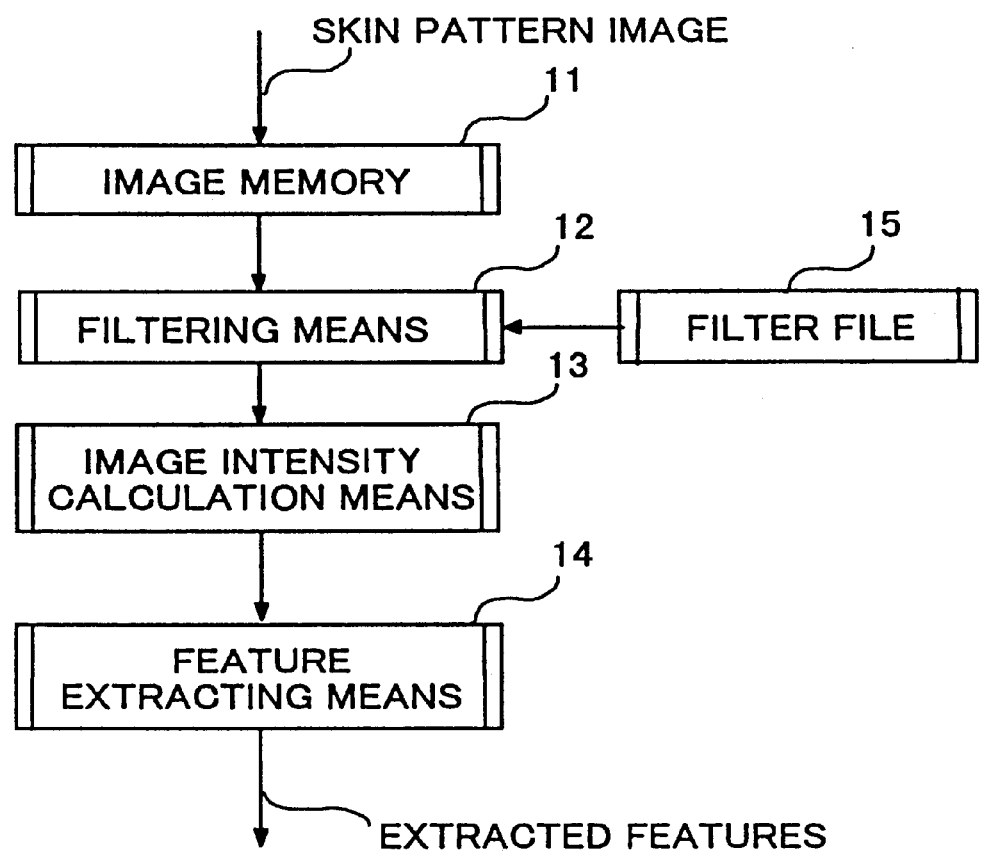
FIG. 1 is a block diagram illustrating a first embodiment of the invention.

Referring to FIG. 1, a first embodiment of the invention comprises a image memory 11 for storing image data of such skin patterns as fingerprint pattern images, a filter file 15 for storing filters prepared for filtering the image data read out from the image memory 11, filtering means 12 for filtering the image data by convolution calculation each by each with filters stored in the filter file 15, image intensity calculation means 13 for calculating image intensities of subregions of each of the filtered data, and feature extracting means 14 for determining features of predetermined subregions of the image data, in accordance with the results calculated in the image intensity calculation means 13.

The image memory 11 is composed of a hard disk memory or a DRAM for storing digital image data of skin pattern images as fingerprint pattern images or palm print pattern images collected by an input device such as a CCD camera or an image scanner.

In the filter file 15, a plurality of filters used by the filtering means 12 are prepared according to a kind of features to be extracted in a DRAM, for example.

In the following descriptions, a set of image data stored in the image memory 11 is assumed to be data of 512×512 pixels with resolution of 20 pixels per mm, and is expressed by a function g(x, y) representing pixel values at coordinates (x, y), where x=0, 1, 2, . . . , 511 and y=0, 1, 2, . . . , 511.

Now, the convolution calculation, and its correspondence to Fourier transform performed in the filtering means 12 is described, taking the case for extracting features of ridge line pitches as an example.

When image data are expressed by g(x, y) (x=0, 1, . . . , m−1 and y=0, 1, . . . , n−1) and a filter is expressed by h(x, y) (x=0, 1, . . . , $m_h$−1 and y=0, 1, 2, . . . , $n_h$−1), the convolution z(x, y) of the image data g(x, y) and a filter h(x, y) is calculated according to the following equation (1).

$$z(x, y) = \sum_{i=0}^{m_h-1} \sum_{j=0}^{n_h-1} g(x-i, y-j) \cdot h(i, j) \tag{1}$$

This convolution calculation on a real plane is equivalent with a product calculation represented by the following equation (2) of each frequency component on a Fourier transformed plane.

$$F\{g(x, y) * h(x, y)\} = F\{g(x, y)\} \cdot F\{h(x, y)\} \tag{2}$$

$$= G(u, v) \cdot H(u, v)$$

where, A*B means convolution of A and B, F{A} means two-dimensional Fourier transform of A, and G(u, v) and H(u, v) mean the Fourier transforms of g(x, y) and h(x, y) expressed on the Fourier transformed plane, respectively.

The two-dimensional Fourier transform is calculated according to the following equation (3).

$$F\{g(x, y)\} = G(u, v) = \frac{1}{\sqrt{mn}} \sum_{x=0}^{m-1} \sum_{y=0}^{n-1} g(x, y) \exp\left(-j2\pi\left(\frac{xu}{m} + \frac{yv}{n}\right)\right) \tag{3}$$

where u=0, 1, . . . , m−1 and v=0, 1, . . . , n−1.

By following equation (4), inverse Fourier transform, a Fourier transform is transferred on the real plane.

$$g(x, y) = F^{-1}\{G(u, v)\} = \frac{1}{\sqrt{mn}} \sum_{u=0}^{m-1} \sum_{v=0}^{n-1} G(u, v) \exp\left(j2\pi\left(\frac{xu}{m} + \frac{yv}{n}\right)\right) \tag{4}$$

Here, for shifting the direct current component G(0, 0) to a center of the Fourier transformed plane, Fourier transform of $(-1)^{x+y}g(x, y)$, hereafter called an optical Fourier transform, is often used for convenience of calculation.

Returning to FIG. 1, preparation of filters for extracting features of ridge line pitches in the filter file 15 will be described.

Figure 2:
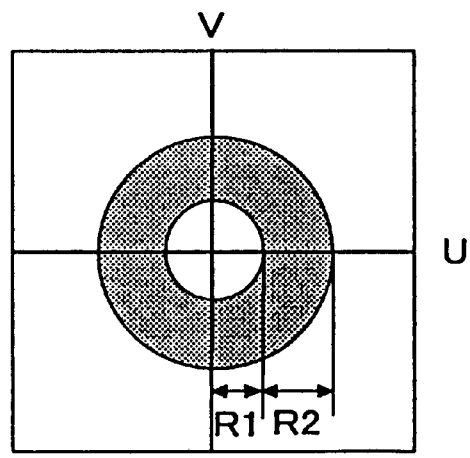
FIG. 2 illustrates an example of a filter designed on a Fourier transformed plane.

For preparing a filter which filters out images of pitch frequency under $R_1$ and over $R_2$, an ideal band-pass filter H(u, v) represented by the following equation (5) and illustrated in FIG. 2 is designed on an optical Fourier transformed plane.

$$H(u, v) = \begin{cases} a & \text{when } R_1 \leq (u^2 + v^2)^{1/2} \leq R_2 \\ 0 & \text{otherwise} \end{cases} \tag{5}$$

Here, α is a constant for normalizing outputs of different filters, determined as follows, for example.

$$\alpha = 1/(R_2^2 - R_1^2) \tag{6}$$

When the resolution of an image is 20 pixels per mm, the ridge line pitches are in a range from about 5 pixels to 20 pixels. This range from about 5 pixels to 20 pixels corresponds to a frequency range from about 100 cycles to 25 cycles, defining 512 pixels as a cycle.

This frequency range from 25 cycles to 100 cycles (a frequency band of 75 cycles) is divided into five ranges of frequency band of 15 cycles each, for example, for designing five filters corresponding to each thereof as shown by $h_1$ to $h_5$ in FIG. 3.

Then, from these filters $H_i$(u, v) (i=1, 2, . . . , 5) designed on the optical Fourier transformed plane, inverse Fourier transforms are calculated for obtaining filters $h_i$(x, y) (i=1, 2, . . . , 5) to be applied for convolution calculation on the real plane. In this inverse Fourier transform, higher frequency components are ignored for simplifying the convolution calculation. Thus, filters on the real plane are obtained approximating corresponding ideal band-pass filters $h_1$ to $h_5$ of FIG. 3. In the example, filter size of these transformed filters is 64—64 pixels. FIG. 4 shows shading images of these five filters defined by $h_1$ to $h_5$ of FIG. 3. The data of these filters shown in FIG. 4 are stored in the filter file 15.

In the filtering means 12, a convolution calculation expressed by the equation (1) is performed. When each of the five filters is denoted by $h_i$(x, y) (i=1, 2, . . . , 5), filtered data obtained through filtering by a filter $h_i$(x, y) are expressed by $g_i$(x, y) as follows, $$g_i(x, y) = g(x, y) * h_i(x, y). \tag{7}$$

Five sets of filtered data $g_i(x, y)$ (i=1, 2, ..., 5) are delivered to the image intensity calculation means 13.

In the image intensity calculation means 13, image intensities P(i, m, n) of predetermined subregions C(m, n) of each set of the filtered data $g_i(x, y)$ are calculated according to the following equation (8), $$P(i, m, n) = \sum_{(x,y) \in C(m,n)} g_i(x, y)^2 \quad (8)$$

Figure 5:
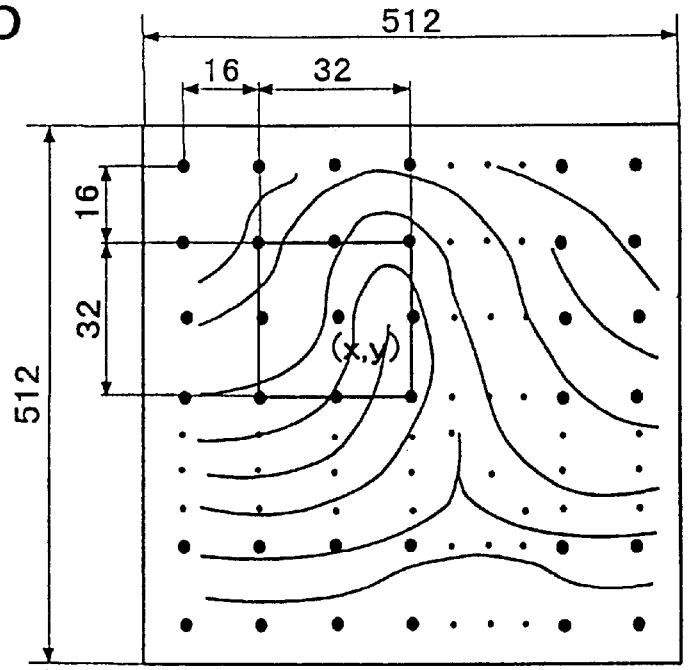
FIG. 5 illustrates an example of arrangement of subregions in a skin pattern image.

Here, in the embodiment, each of the subregions C(m, n) is defined as a square region consisting of 32×32 pixels as shown in FIG. 5, having its center on coordinates (m, n) arranged by every 16 pixels in x and y direction of the plane of 512×512 pixels, as represented by a bullet in FIG. 5, of each set of filtered data.

The image intensity calculation means 13 delivers the calculated results P(i, m, n) to the feature extracting means 14. The feature extracting means 14 determine features of the predetermined subregions of the skin pattern image. When a filter $h_1(x, y)$, for example, represented by $h_1$ in FIG. 3 gives the maximum value of the image intensities P(i, m, n) (i=1, 2, ..., 5) for a subregion C(m, n), ridge line pitch feature τ of the subregion C (m, n) is calculated as follows.

$$\tau = \frac{512}{(R_1 + R_2)/2} \quad (9)$$
$$= \frac{512}{(25 + 40)} = 15.7 \text{ pixels}$$

Thus, features for every subregion are determined in the feature extracting means 14.

Now, a second embodiment of the invention is described, wherein filtering of skin pattern images are performed by product calculation of each frequency component of the Fourier transforms.

Figure 6:
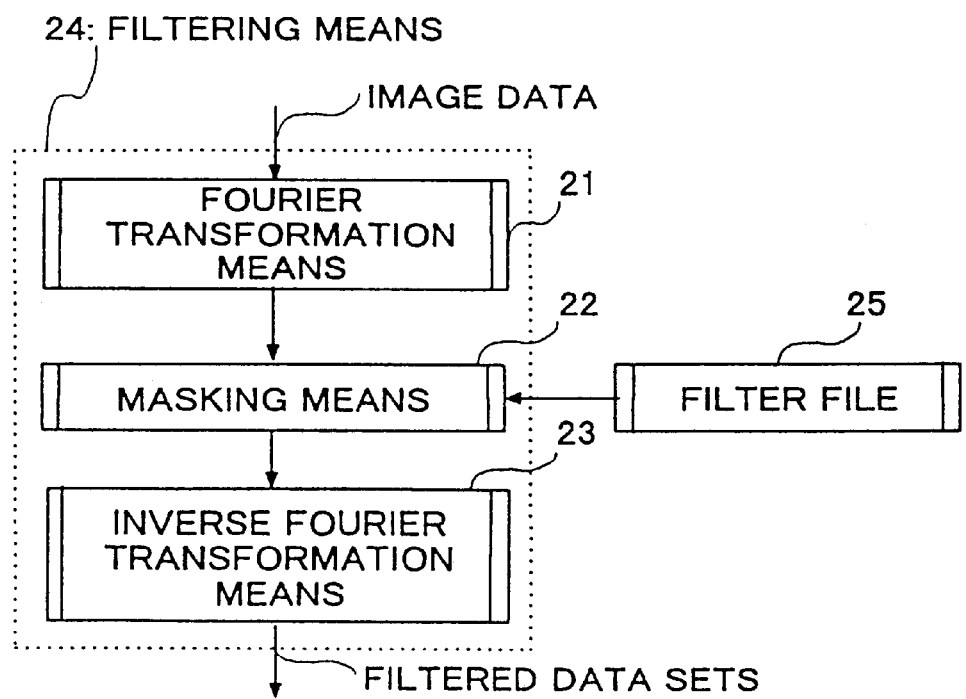
FIG. 6 is a block diagram of a filtering means 24 of a second embodiment of the invention.

FIG. 6 is a block diagram of another filtering means 24 of the second embodiment corresponding to the filtering means 12 of FIG. 1, comprising Fourier transformation means 21 for performing two-dimensional optical Fourier transform of image data read out from the image memory 11, masking means 22 for performing product calculation between image data delivered from the Fourier transformation means 21 and filters prepared in a filter file 25, and inverse Fourier transformation means 23 for performing inverse optical Fourier transform of the masked data obtained from the masking means 22.

The embodiment is described following the example applied in connection with the first embodiment for extracting features of ridge line pitches of a skin pattern image.

In the filter file 25, the ideal band-pass filters $H_i(u, v)$ (i=1, 2, ... 5) designed on the optical Fourier transformed plane having data of 512×512 pixels are stored intact without transformation. The Fourier transformation means 21 transforms the skin pattern image g(x, Y) according to the equation (3) for obtaining an optical Fourier transform G(u, v) thereof.

In the masking means 22, real and imaginary part of each frequency component of the Fourier transform G(u, v) are multiplied by those of the five band-pass filters Hi(u, v) one by one.

Five sets of masked data $G_i(u, v) = G(u, v) \cdot H_i(u, v)$ are processed with inverse optical Fourier transform described in connection with the equation (4) in the inverse Fourier transformation means 23 for obtaining five sets of filtered data $g_i(x, y)$ to be processed in the image intensity calculation means 13 of FIG. 1 as same as in the first embodiment.

Filtering by convolution calculation as performed in the first embodiment needs a number of operations proportional to the filter size. So, the filters for convolution calculation are generally restrained in a size, 64×64 in the example described, accompanied with inevitable approximation.

On the other hand, for filtering by masking calculation as performed in the second embodiment, ideal band-pass filters can be designed in a finite Fourier transformed plane with no approximation. Furthermore, for image data with its sides expressed by a power of 2, fast Fourier transform can be applied for high speed calculation.

It is apparent that the optical Fourier transform can be replaced with the fast Fourier transform or an ordinary digital Fourier transform by preparing appropriate filters. Therefore, it can be said that there are more merits in the second embodiment compared to the first embodiment when filter size is not sufficiently small.

Now, a third embodiment will be described, wherein the feature extracting means 14 of FIG. 1 is replaced with another feature extracting means 30 illustrated in FIG. 7.

In the third embodiment, there is defined an evaluation function, variable of which are feature parameters of each subregion, representing sum total of image intensities (multiplied by −1) of all subregions and sum total of square sums of differences between values of the feature parameter of each subregion and that of neighboring subregions. Each of the feature parameters which gives the minimum value of the evaluation function is determined as the feature of each subregion in the third embodiment.

Figures 7, 8:
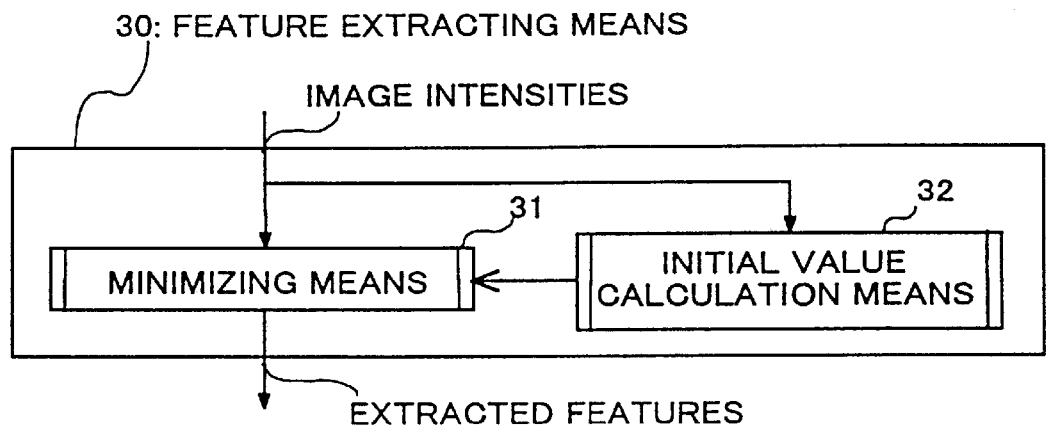
FIG. 7 is a block diagram of a feature extracting means 30 of a third embodiment of the invention.
FIG. 8 illustrates a subregion C(m, n) and neighboring subregions C(m', n') around the subregion C(m, n).

For this purpose, the feature extracting means 30 of FIG. 7 comprises minimizing means 31 and initial value calculation means 32.

From the image intensity calculation means 13 of FIG. 1, the image intensities P(i, m, n) are delivered to the initial value calculation means 31 for determining initial values $s_0(m, n)$ of feature parameters, namely ridge line pitches that give a highest value of the image intensities P(i, m, n) of each subregion C(m, n) as same as in the first embodiment.

The map of the initial values $s_0(m, n)$ for all the subregions shows an initial two-dimensional feature pattern of the skin pattern image. For smoothing the initial two-dimensional feature pattern, the initial value $s_0(m, n)$ of a concerning subregion C(m, n) is replaced with a most appropriate value s(m, n), among five values of feature parameters, which gives a minimum value of the evaluation function E(s(m, n)) represented by a following equation (10) in the minimizing means 31.

$$E(s(m, n)) = -\sum_{(m,n)} P(s(m, n), m, n) + \sum_{(m,n)} \sum_{(m',n')} D(s(m, n), s_0(m', n')) \quad (10)$$

where, (m', n') means coordinates of neighboring subregions of the concerning subregion C(m, n), 5×5−1 subregions shown in FIG. 8 in an example, and $D(s(m,n), s_0(m', n'))$ is a function representing singularity of a value s(m, n), namely the current feature parameter, among its neighborhood, expressed as follows in an example, α being a coefficient.

$$D(s(m, n), s_0(m', n')) = \alpha \{s(m, n) - s_0(m', n')\}^2 \quad (11)$$

Figure 9:
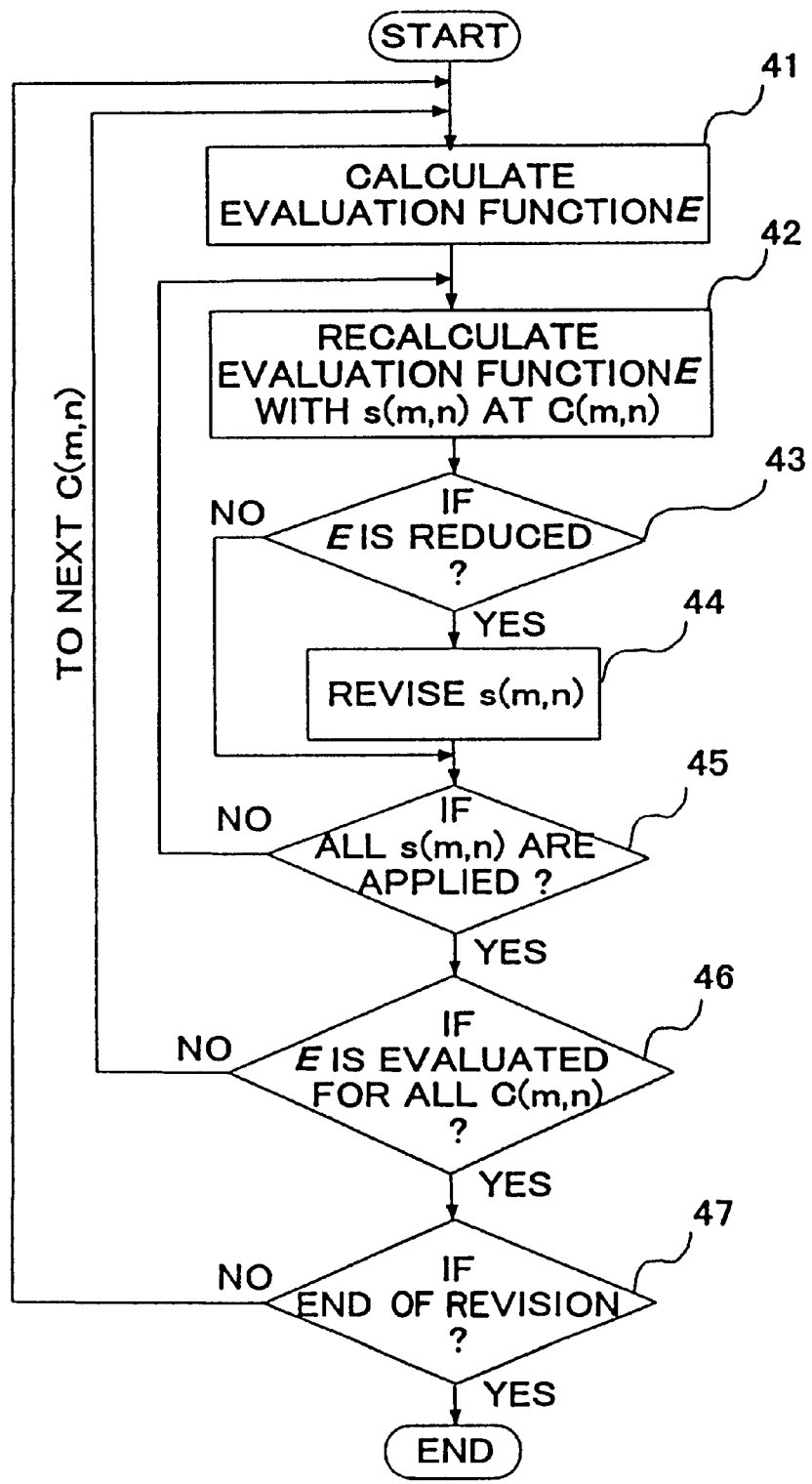
FIG. 9 is a flowchart illustrating operation of the feature extracting means 30 of FIG. 7.

Thus, the minimization of the evaluation function E(s(m, n)) is performed for every subregion C(m, n) replacing initial value $s_0(m, n)$ by an appropriate value s(m, n) one by one, and these processes are repeated several times determined for converging the minimization as shown by a flowchart illustrated in FIG. 9.

In step 41, initial value of the evaluation function E is calculated according to the equation (10) with the initial values $s_0(m, n)$ of feature parameters. Then, in step 42, value of the evaluation function E is recalculated for a subregion C(m, n) with other values $s_{i\neq 0}(m, n)$ one by one (checked in step 45) for replacing the initial value $s_0(m, n)$ (in step 44) when the evaluation function E is found reduced (in step 43). Steps 42 to 46 are performed for all subregions C(m, n) through step 46 and repeated several times through step 47.

Thus, a smoothed two-dimensional feature pattern giving the minimum value of the evaluation function E is obtained in the embodiment.

Figure 10:
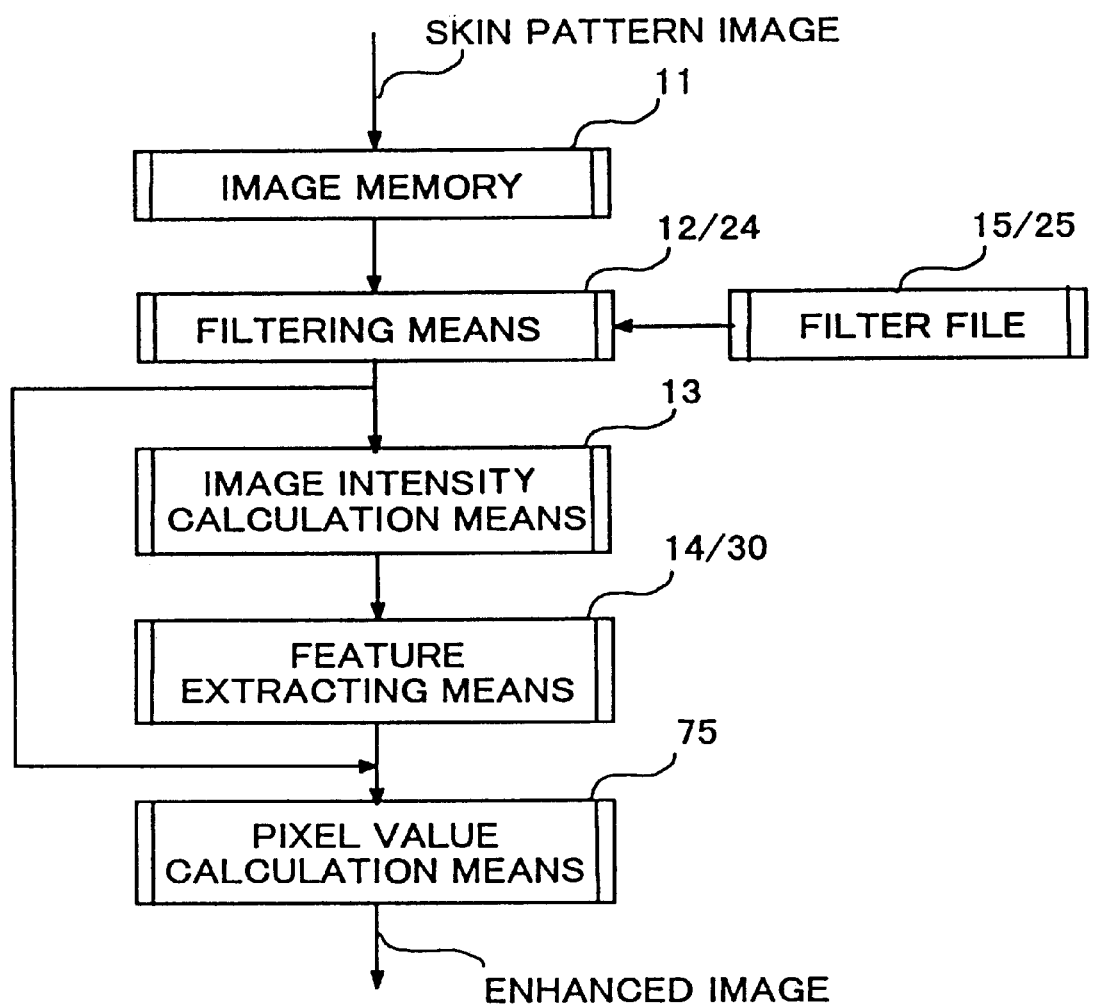
FIG. 10 is a block diagram illustrating a fourth embodiment of the invention.

Now referring to FIG. 10, a fourth embodiment providing a skin pattern image processor is described, wherein the extracting method of skin pattern features of the invention is applied.

In the block diagram of FIG. 10, pixel value calculation means 75 are included in addition to the block diagram referred to in connection with the first, second or the third embodiment, for generating image data of a feature enhanced skin pattern.

Taking the example of FIG. 5, each pixel belongs to four subregions since the subregions are defined overlapped. Therefore, at most four values are obtained for each pixel from filtered data sets corresponding to features assigned to the four subregions where the pixel belongs. Average of these at most four values for each pixel is output as each pixel value of the image data of the feature enhanced skin pattern image.

Figure 11:
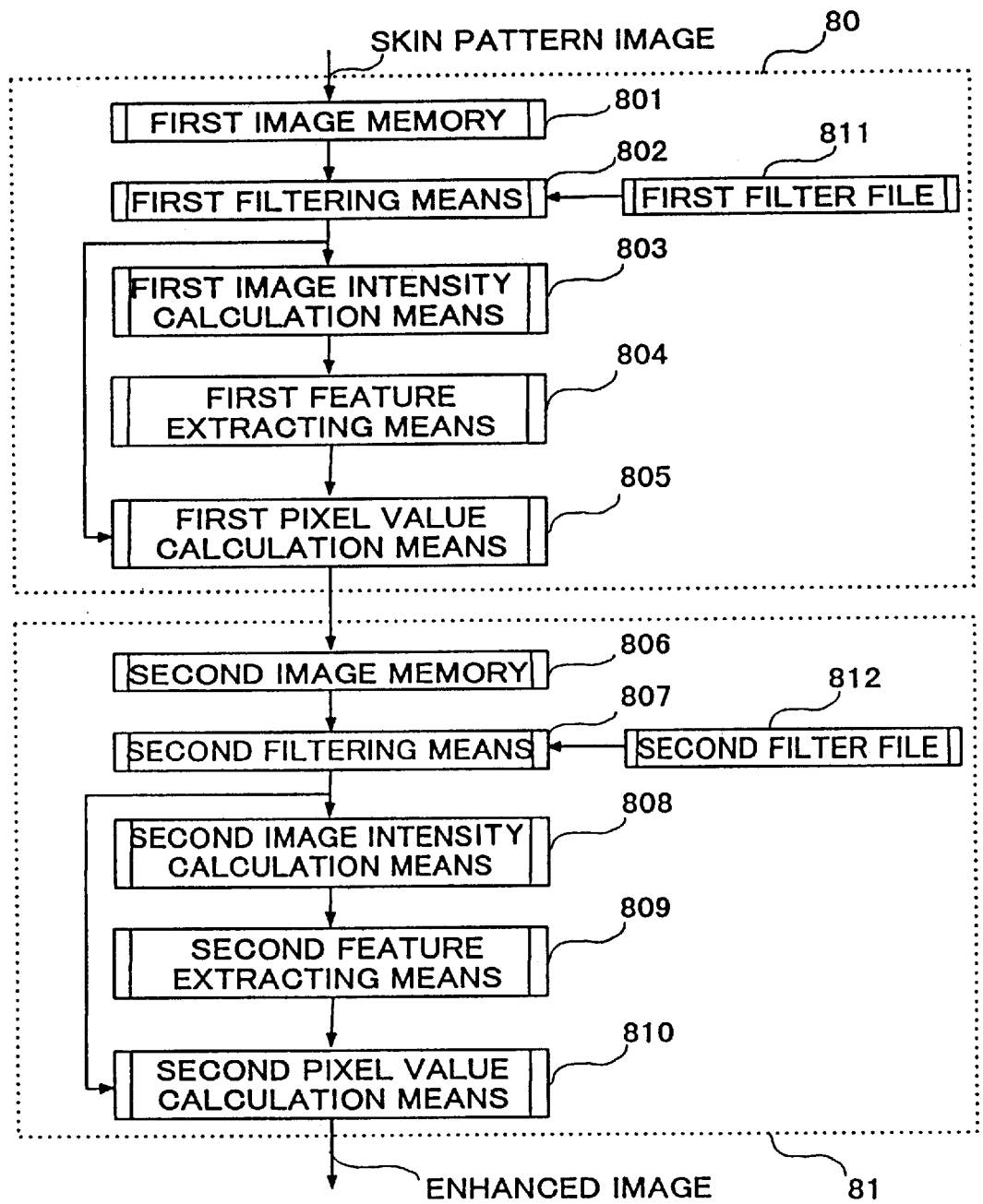
FIG. 11 is a block diagram illustrating a fifth embodiment of the invention.

In a fifth embodiment illustrated in FIG. 11, skin pattern image processors of FIG. 10 are cascaded for enhancing plural kinds of features of skin pattern image data. An example of the embodiment of FIG. 11 includes of two skin pattern image processors 80 and 81, wherein skin pattern image data enhanced of ridge line pitch features by the skin pattern processor 80 are stored in a second image memory 806 to be processed with filters prepared for extracting ridge line direction features of the skin pattern image data.

Therefore, a more smoothed skin pattern image can be obtained with features of two kinds enhanced in the embodiment.

It goes without saying that feature data of each kind, to be used for classifying skin pattern images, for example, can be obtained also in the embodiment from each feature extracting means 804 and 809 in addition to the feature enhanced skin pattern.

The embodiments are described heretofore in connection with the example provided of five filters for extracting ridge line pitch features. However, any other appropriate filters can be used for extracting desired features of skin pattern images and processing them for enhancing the desired features thereof.

In the following paragraphs, other examples of filter sets prepared for masking Fourier transforms of skin pattern image data are described.

Figures 12A, 12B, 12C, 12D:
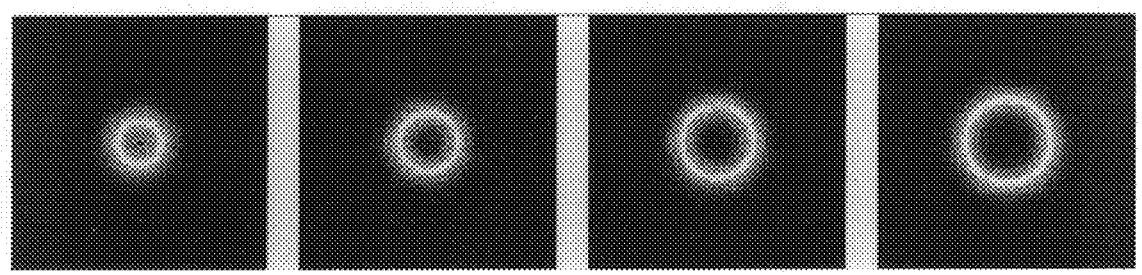
FIG. 12 shows shading images of examples of filters prepared in a first filter file 811 of FIG. 11.
Figures 12E, 12F, 12G, 12H:
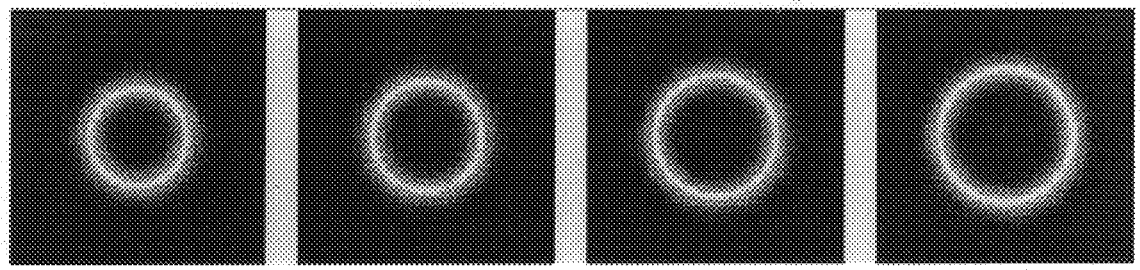
Figures 12I, 12J:
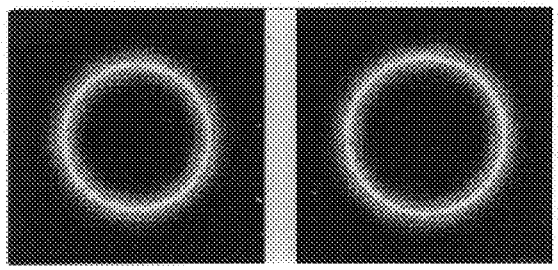
Figure 14:
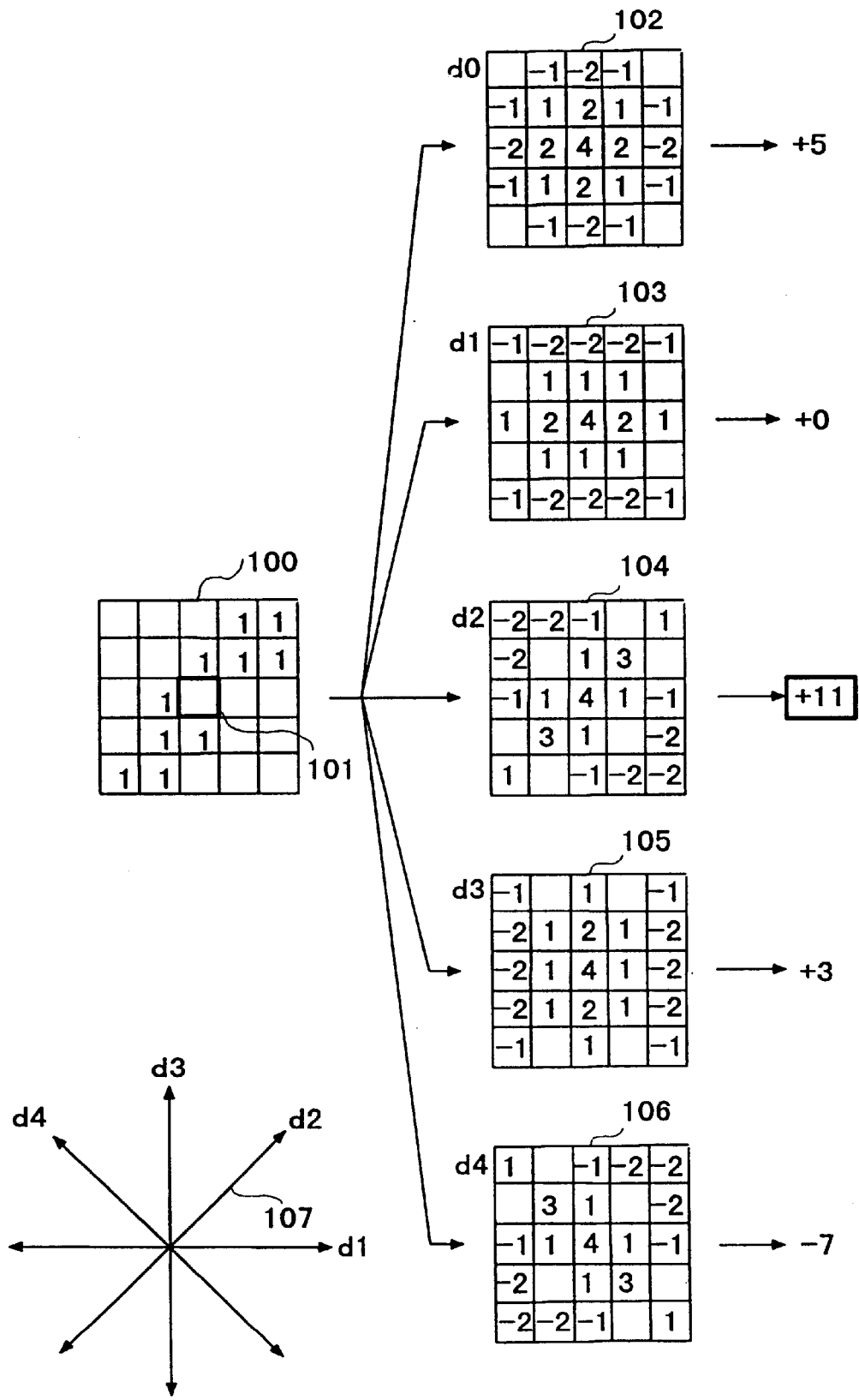
FIG. 14 is a diagram illustrating principle of a prior art.

FIG. 12 shows shading images of a filter set that includes ten band-pass filters for extracting ridge line pitch features by masking optical Fourier transforms of skin pattern image data prepared in a first filter file of 811 of the embodiment of FIG. 11. Pixel values $W_r(|\gamma|)$ of each of the band-pass filters of FIG. 12 are represented by the following equation (12) symmetric with respect to its origin.

$$W_r(|r|) = \frac{1}{|r|}\exp\left(-\frac{(|r|-r_0)^2}{2\sigma_r^2}\right) \bigg/ \int \frac{1}{|r|}\exp\left(-\frac{(|r|-r_0)^2}{2\sigma_r^2}\right)d|r| \quad (12)$$

where vector $\gamma$ denotes coordinates of a pixel on an optical Fourier transformed plane of 512×512 pixels with origin at its center, $\gamma_0$ and $\sigma_r$ corresponding to a center frequency and a frequency width of pass-band respectively of each of the ten band-pass filters.

In the examples of FIG. 12, $\gamma_0$ are arranged by every 5.7 pixels from 28.4 to 79.6 pixels on condition $\sigma_r$ is 12.0.

By the way, shading images in FIG. 12 show center regions of the band-pass filters and the brighter dot represents the larger pixel value, darkest dot representing pixel value of 0.

FIG. 13 shows shading images of another filter set that includes 16 directional filters for extracting ridge line direction features by masking Fourier transforms of skin pattern image data prepared in a second filter file 812 of the example of FIG. 11. Pixel values $W_\theta(\gamma)$ of each of the directional filters of FIG. 13 are represented by the following equation (13) line symmetric.

$$W_\theta(r) = \exp\left(-\frac{1}{2\sigma_\theta^2}\left(\cos^{-1}\frac{|r \cdot e_\theta|}{|r|}\right)^2\right) \quad (13)$$

where, $e_\theta=(\cos\theta, \sin\theta)$ denotes unit vector of each direction $\theta$ represented by each of the directional filters and $\sigma_\theta$, 0.4 in the examples of FIG. 13, is a parameter representing phase angle width of the pass-band.

As for the singularity function $D(s(m, n), s_0(m', n'))$ in the evaluation function E of the equation (10), Euclidean distances expressed by the following equation (14) are better to be applied here, for smoothing directional features by directional filtering, instead of the equation (11).

$$D(s(m, n), s_0(m', n')) = \quad (14)$$
$$\alpha\{(\sin 2\theta(m, n) - \sin 2\theta(m', n'))^2 + (\cos 2\theta(m, n) - \cos 2\theta(m', n'))^2\}$$

where $\theta(m, n)$ is directional feature of a subregion C(m, n).

Thus, by smoothing ridge direction features of a skin pattern image after smoothing its ridge line pitch features, or vice versa, a more enhancing and reliable image processing can be provided in the present invention.

Returning to FIG. 11, two skin pattern image processors of FIG. 10 are cascaded in the fifth embodiment for obtaining smoothed skin pattern images with their features of two kinds enhanced or extracting two kinds of features. However, by preparing filters according to kinds of features to be extracted or enhanced, plural kinds of features can be extracted or enhanced of a skin pattern image with one skin pattern image processor.

In a sixth embodiment having the same configuration as the fourth embodiment of FIG. 10, a filter set for extracting and enhancing plural kinds of features, ridge line pitch features and ridge line direction features, for example, is prepared in the filter file 25.

For preparing the filter set corresponding to the filter sets of FIG. 12 and FIG. 13, each filter is given from a product $W_{\theta\gamma}(\gamma)$ of a filter of FIG. 12 expressed by the equation (12) and a filter of FIG. 13 expressed by the equation (13) as follows.

$$W_{\theta,r}(r) = W_\theta(r)W_r(|r|) \tag{15}$$

$$= \exp\left(-\frac{1}{2\sigma_\theta^2}\left(\cos^{-1}\frac{|r \cdot e_\theta|}{|r|}\right)^2\right) \cdot$$

$$\frac{\frac{1}{|r|}\exp\left(-\frac{(|r|-r_0)^2}{2\sigma_r^2}\right)}{\int \frac{1}{|r|}\exp\left(-\frac{(|r|-r_0)^2}{2\sigma_r^2}\right)d|r|}$$

If the ridge line pitch features are to be classified into ten values of $\gamma_0$ and the ridge line direction feachures are to be classified into 16 values of $\theta$ as same as FIGS. 12 and 13, a set of 160 filters is thus prepared.

In the image intensity calculation means 13 of the sixth embodiment, image intensities $P(\theta, \gamma_0, m, n)$ of the predetermined subregions $C(m, n)$ are calculated for every 160 filtered data $g(\theta, \gamma_0, x, y)$ obtained from the skin pattern image $g(x, y)$ by filtering with the 160 filters $W_{\theta,\gamma}(\gamma)$ as follows in a same way as the equation (8).

$$P(\theta, r_\theta, m, n) = \sum_{(x,y)\in C(m,n)} g(\theta, r_0, x, y)^2$$

In the feature extracting means 30 of the sixth embodiment, vector values $$v(m, n) = \begin{pmatrix} \theta(m, n) \\ r_0(m, n) \end{pmatrix}$$

representing ridge line pitch featuers and ridge line direction features for the predetermined subregions $C(m, n)$ are obtained from the image intensities $P(\theta, \gamma_0, m, n)$ calculated by the image intencity calculation means 13 in a similar way as described in connection with FIGS. 7 to 9.

In the initial value calculation means 32, initial values $v_0(m, n)$ are calculated from parameters $(\theta, \gamma_0)$ of filters $W_{\theta,\gamma}(\gamma)$ which give maximum intencities $P(\theta,\gamma_0, m, n)$ of filtered data for the predetermined subregions $C(m, n)$. Starting from the initial values $v_0(m, n)$, a two-dimensional feature pattern of the vector values $v(m, n)$ is determined in the minimizing means 31 to minimize an evaluation function represented by a following equation (16).

$$E(v(m, n)) = -\sum_{(m,n)} P(\theta, r_0, m, n) + \sum_{(m,n)}\sum_{(m',n')} D(v(m,n), v_0(m', n')) \tag{16}$$

where, $$D(v(m, n), v_0(m', n')) =$$
$$\alpha\{(\sin 2\theta(m, n) - \sin 2\theta(m', n'))^2 + (\cos 2\theta(m, n) - \cos 2\theta(m', n'))^2\} +$$
$$\beta\{r_0(m, n) - r_0(m', n')\}^2$$

Thus, two kinds of features of each subregion of a skin pattern image are extracted in the sixth embodiment. The smoothed skin pattern image is obtained by the pixel value calculation means 75 in the same way with the fourth embodiment from filtered data corresponding to the two kinds of features extracted for each subregion.

And as beforehand described, still more kinds of features can be extracted and still more kinds of filtering or smoothing can be performed with still more kinds of filter sets while remaining within the scope of the invention.

What is claimed is:

1. An apparatus for extracting features of predetermined subregions of a skin pattern image, comprising:

an image memory for storing image data of the skin pattern image;

a filter file for storing a plurality of filters consisting of two-dimensional data prepared according to the features to be extracted;

filtering means for outputting filtered data sets, each of said filtered data sets obtained from said image data by convolution calculation with each of said plurality of filters;

image intensity calculation means for calculating image intensity of each of the predetermined subregions of each of said filtered data sets; and feature extracting means for determining the features of the predetermined subregions of the skin pattern image referring to said image intensity of each of the predetermined subregions of each of said filtered data sets, wherein:

said feature extracting means determines the features of a predetermined subregion of the skin pattern image according to feature parameters minimizing an evaluation function, said evaluation function being a linear function of said image intensity of each of the subregions of one of said filtered data sets corresponding to a feature parameter assigned to said each of the subregions, and a value corresponding said feature parameter assigned to the predetermined subregion compared to the feature parameters assigned to the subregions neighboring the predetermined subregion.

2. A skin pattern processor for generating a filtered skin pattern image by smoothing and enhancing features of predetermined subregions of a skin pattern image, comprising:

an image memory for storing image data of the skin pattern image;

a filter file for storing a plurality of filters consisting of two-dimensional data prepared according to the features to be extracted;

filtering means for outputting filtered data sets, each of said filtered data sets obtained from said image data by convolution calculation with each of said plurality of filters;

image intensity calculation means for calculating image intensity of each of the predetermined subregions of each of said filtered data sets;

feature extracting means for determining the features of the predetermined subregions of the skin pattern image referring to said image intensity of each of the predetermined subregions of each of said filtered data sets; and pixel value calculating means for calculating a value of each pixel of the filtered skin pattern image from values of pixels of certain of said filtered data sets corresponding to said each pixel, each of said certain of said filtered data sets corresponding to each of the features extracted of the predetermined subregions where said each pixel belongs, wherein said feature extracting means determines the features of a predetermined subregion of the skin pattern image according to feature parameters minimizing an evaluation function, said evaluation function being a linear function of said image intensity of each of the subregions of one of said filtered data sets corresponding to a feature parameter assigned to said each of the subregions, and a value corresponding to said feature parameter assigned to the predetermined subregion compared to the feature parameters assigned to the subregions neighboring the predetermined subregion.

3. An apparatus for extracting features of predetermined subregions of a skin pattern image, comprising:

an image memory for storing image data of the skin pattern image;

a filter file for storing a plurality of filters consisting of two-dimensional data prepared according to the features to be extracted;

filtering means for outputting filtered data sets, each of said filtered data sets being an inverse Fourier transform of a masked data set obtained from a Fourier transform of said image data by product calculation of each frequency component of said Fourier transform and each of said plurality of filters;

image intensity calculation means for calculating image intensity of each of the predetermined subregions of each of said filtered data sets; and feature extracting means for determining the features of the predetermined subregions of the skin pattern image referring to said image intensity of each of the predetermined subregions of each of said filtered data sets, wherein:

said feature extracting means determines the features of a predetermined subregion of the skin pattern image according to feature parameters minimizing an evaluation function, said evaluation function being a linear function of said image intensity of each of the subregions of one of said filtered data sets corresponding to a feature parameter assigned to said each of the subregions, and a value corresponding to said feature parameter assigned to the predetermined subregion compared to the feature parameters assigned to the subregions neighboring the predetermined subregion.

4. A skin pattern image processor for generating a filtered skin pattern image by smoothing and enhancing features of predetermined subregions of a skin pattern image, comprising:

an image memory for storing image data of the skin pattern image;

a filter file for storing a plurality of filters consisting of two-dimensional data prepared according to the features to be extracted;

filtering means for outputting filtered data sets, each of said filtered data sets being an inverse Fourier transform of a masked data set obtained from a Fourier transform of said image data by product calculation of each frequency component of said Fourier transform and each of said plurality of filters;

image intensity calculation means for calculating image intensity of each of the predetermined subregions of each of said filtered data sets;

feature extracting means for determining the features of the predetermined subregions of the skin pattern image referring to said image intensity of each of the predetermined subregions of each of said filtered data sets; and pixel value calculating means for calculating a value of each pixel of the filtered skin pattern image from values of pixels of certain of said filtered data sets corresponding to said each pixel, each of said certain of said filtered data sets corresponding to each of the features extracted of the predetermined subregions where said each pixel belongs, wherein said feature extracting means determines the features of a predetermined subregion of the skin pattern image according to feature parameters minimizing an evaluation function, said evaluation function being a linear function of said image intensity of each of the subregions of one of said filtered data sets corresponding to a feature parameter assigned to said each of the subregions, and a value corresponding to said feature parameter assigned to the predetermined subregion compared to the feature parameters assigned to the subregions neighboring the predetermined subregion.

* * * * *